May 12, 1925.

D. W. PECK ET AL 1,537,135

LEVER

Filed May 28, 1924

INVENTORS
DONALD WESLEY PECK
ROBERT DANFORD McALLISTER

BY

ATTORNEYS

Patented May 12, 1925.

1,537,135

UNITED STATES PATENT OFFICE.

DONALD WESLEY PECK AND ROBERT DANFORD McALLISTER, OF VANCOUVER, BRITISH COLUMBIA, CANADA.

LEVER.

Application filed May 28, 1924. Serial No. 716,515.

*To all whom it may concern:*

Be it known that we, DONALD WESLEY PECK and ROBERT DANFORD McALLISTER, both subjects of the King of Great Britain, and both residents of the city of Vancouver, in the Province of British Columbia, Canada, have invented certain new and useful Improvements in Levers, of which the following is a specification.

Our invention relates to improvements in levers which are particularly adaptable for use on automobile brakes and the like, the objects of the invention being to provide means whereby lever latching means is actuated by a handle which forms the operating handle of the lever, a further object is to provide a simple means whereby the latching means of the lever may be conveniently locked to prevent any unauthorized movement of the lever.

The invention consists essentially of a lever having an operating handle hingingly mounted thereon and a lever latching rod connected to the handle to be actuated thereby, as will be more fully described in the following specification in which:—

In the drawings like characters of reference indicate corresponding parts in each figure.

Figures 1, 2, 3:
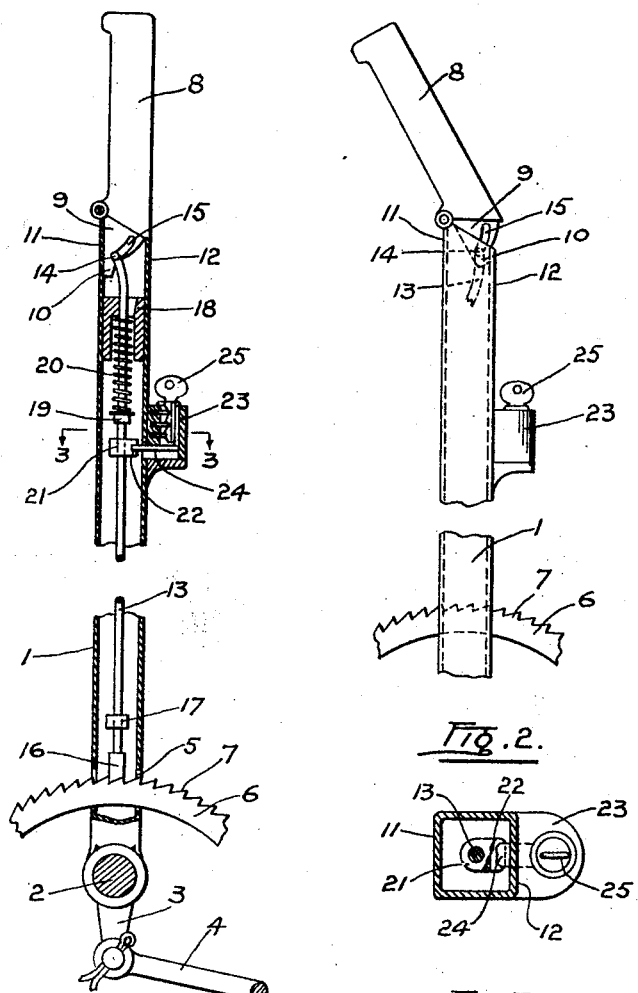
Fig. 1 is a sectional view showing the lever locked against operation.
Fig. 2 is a fragmentary view showing the lever handle in position for disengaging the latching mechanism.
Fig. 3 is a sectional view taken on the line 3—3 of Figure 1.

The numeral 1 indicates a lever which is preferably of hollow construction. The lever is fulcrumed upon a shaft 2 and is provided with a downward extension 3 to which the brake rod 4 is connected. The base of the lever is slotted to accommodate a brake quadrant 6 which is provided with ratchet teeth 7. Hingingly mounted at the upper end and to the forward side of the lever 1 is a handle 8 which is provided with an extension lug 9 having a stop 10 which is adapted to contact with the front wall 11 of the lever when the handle is in normal position and to contact with the rear wall 12 when the hand is thrown forward to raise the latching means from the quadrant 6.

The numeral 13 indicates a latch rod, pin connected as at 14 in a slotted aperture 15 in the heel of the handle 8 and having at its lower end a dog 16 which is adapted to engage the teeth 7 of the quadrant 6 to hold the lever in any desired position. The rod is slidably mounted in a block 17 adjacent the quadrant and a further block 18 adjacent the handle and is provided with a fixed collar 19 between which and the block 18 a spring 20 is mounted for the purpose of depressing the rod 13 and for holding the handle 8 in alignment wtih the lever 1. A block 21 is secured to the rod 13 which is provided with a transverse groove 22 the purpose of which will appear later.

A lock 23, preferably of the cylinder type is mounted exteriorly of the lever 1 and is provided with a rotatable latch tongue 24 which is adapted to swing into engagement with the groove 22 of the block 21 when the key 25 is in position for removal from the lock, and to swing clear of the block 21 when the key is turned to one side.

Having thus described the several parts of our invention we will now briefly explain its operation.

To apply the brake it suffices to draw the lever 1 rearwards when the dog 16 rides along the teeth 7 of the quadrant 6 and the pin connection 14 of the rod 13 slides within the slotted aperture 15 of the handle 8, when the handle is released the dog 16 comes to rest against one of the teeth 7 holding the brake in set position.

An alternate method is to tilt the handle forward causing the pin connection to engage the lower end of the slotted aperture 15 and raising the dog clear of the teeth of the quadrant until the desired position of the lever is obtained, when restoring the handle to normal position latches the brake dog 16 to the quadrant.

To release the brake it suffices to hold the lever against movement and to tilt the handle forwards when the dog is raised from contact with the quadrant teeth and the lever is free to be returned to the "off" position. When the lever is in any position where the dog 16 is in normal engagement with one of the teeth 7 of the quadrant the turning of the key 25 to a position from which it can be removed from the lock brings the latch tongue 24 into engagement with the groove 22 of the block 21, rendering the rod 13 immovable with its dog 16 in locked engagement with the quadrant so that no movement of the lever can be effected.

What we claim as our invention is:

1. A device of the character described comprising a hollow lever pivoted at its lower end, a rack bar passing transversely through the lever above the pivot, a latch slidable in the lever for engaging the teeth of the rack bar to hold the lever in a set position, a rod extending upwardly from the latch, a handle pivoted to the upper end of the lever and provided with a segment shaped portion adapted to be received wherein the lever when the handle and lever are in aligned position, said segment shaped portion being formed with a curved slot in which is engaged a pin carried at the upper end of said rod, a spring encircling said rod, an abutment carried by the rod for engaging one end of the spring and a second abutment carried by the lever for engaging the opposite end of the spring, and means for locking said rod against movement when the latch is engaged with the teeth of the rack bar.

2. A structure according to claim 1, in which the segment shaped portion of the handle is formed to contact with opposite portions of the lever to limit swinging movement of the handle in either direction.

Dated at Vancouver, B. C., this 5th day of May, 1924.

DONALD WESLEY PECK.
ROBERT DANFORD McALLISTER.

Witnesses:
J. J. JOHNSTON,
ERNEST E. CARVER.